(12) United States Patent
Zhao et al.

(10) Patent No.: US 11,029,866 B2
(45) Date of Patent: Jun. 8, 2021

(54) METHODS, DEVICES, AND COMPUTER PROGRAM PRODUCTS FOR PROCESSING DATA

(71) Applicant: EMC IP Holding Company LLC, Hopkinton, MA (US)

(72) Inventors: Junping Zhao, Beijing (CN); Andrew Anzhou Hou, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 29 days.

(21) Appl. No.: 16/415,812

(22) Filed: May 17, 2019

(65) Prior Publication Data

US 2020/0133533 A1 Apr. 30, 2020

(30) Foreign Application Priority Data

Oct. 31, 2018 (CN) .......................... 201811291214.3

(51) Int. Cl.
*G06F 3/06* (2006.01)
*G06N 20/00* (2019.01)

(52) U.S. Cl.
CPC .......... *G06F 3/0631* (2013.01); *G06F 3/0604* (2013.01); *G06F 3/0653* (2013.01); *G06F 3/0659* (2013.01); *G06F 3/0673* (2013.01); *G06N 20/00* (2019.01)

(58) Field of Classification Search
None
See application file for complete search history.

(56) References Cited

U.S. PATENT DOCUMENTS

| 8,669,990 B2* | 3/2014 | Sprangle | G06T 1/20 |
| | | | 345/522 |
| 9,158,569 B2* | 10/2015 | Mitra | G06F 9/4555 |
| 10,203,988 B2* | 2/2019 | Fong | G06F 9/5061 |
| 2005/0086427 A1* | 4/2005 | Fozard | G06F 16/10 |
| | | | 711/111 |

(Continued)

OTHER PUBLICATIONS

Jason Brownlee, "Image Augmentation for Deep Learning with Keras," machinelearningmastery.com/image-autmentation-deep-learning-keras/, Jun. 29, 2016, 16 pages.

(Continued)

*Primary Examiner* — Elias Mamo
(74) *Attorney, Agent, or Firm* — Ryan, Mason & Lewis, LLP

(57) ABSTRACT

A method comprises: determining whether an event triggering processing of data at a storage device occurs, the data being predetermined to be processed at a computing device associated with the storage device; in response to determining that the event occurs, determining available resources of the storage device; and in response to an amount of the available resources exceeding a first predetermined threshold, causing the storage device to process the data and provide the processed data to the computing device. As such, operations to be performed to data may be adaptively allocated, deployed and adjusted on the storage device and the computing device, so that computing capabilities of both the storage device and the computing device may be fully leveraged, and further the computing efficiency of the entire data processing system may be improved.

19 Claims, 6 Drawing Sheets

(56) References Cited

U.S. PATENT DOCUMENTS

2007/0113223 A1* 5/2007 Ludwig ................ G06F 8/445
717/161
2017/0337138 A1* 11/2017 Li ....................... G06F 12/0246

OTHER PUBLICATIONS

Tensorflow.org, "Benchmarks," tensorflow.org/guide/performance/benchmarks, downloaded May 16, 2019, 15 pages.

* cited by examiner

METHODS, DEVICES, AND COMPUTER PROGRAM PRODUCTS FOR PROCESSING DATA

RELATED APPLICATION(S)

The present application claims priority to Chinese Patent Application No. 201811291214.3, filed Oct. 31, 2018, and entitled "Methods, Devices, and Computer Program Products for Processing Data," which is incorporated by reference herein in its entirety.

FIELD

Embodiments of the present disclosure generally relate to the field of data processing, and more specifically, to methods, devices, and computer program products for processing data.

BACKGROUND

Artificial intelligence (e.g., machine learning and deep learning) has been widely developed, and numbers of artificial intelligence and deep learning applications have been deployed. In practice, deep learning usually needs to perform pre-processing operations to mass data. A traditional deep learning system architecture may comprise multiple storage devices and multiple computing devices, which form a storage cluster and a computing cluster in a deep learning system architecture. Storage devices may also be referred to as storage nodes, and each storage device may comprise multiple storage. Computing devices may also be referred to as computing nodes, and each computing device may comprise multiple central processing units and dedicated processing resources, such as graphic processing units (GPUs). The storage cluster and the computing cluster may be connected via a network. In the traditional deep learning system architecture, the storage cluster is used to store data for deep learning only. When performing deep learning, the computing cluster reads raw data from the storage cluster via the network, and central processing units in the computing cluster process these raw data (also referred to as pre-processing). Then, processed raw data are provided to graphic processing units in the computing cluster to be used for training. However, with the development of deep learning technology, the traditional deep learning system architecture needs to process more and more data, so it may be considered to be read-intensive and is not high-demanding on the computing capability. Since data are processed only in the computing cluster, the data processing efficiency is limited, and further the traditional deep learning architecture is incapable of performing as required/needed.

SUMMARY

Embodiments of the present disclosure provide methods, devices, and computer program products for processing data.

In a first aspect of the present disclosure, provided is a method of processing data. The method comprises: determining whether an event triggering processing of data at a storage device occurs, the data being predetermined to be processed at a computing device associated with the storage device; in response to determining that the event occurs, determining available resources of the storage device; and in response to an amount of the available resources exceeding a first predetermined threshold, causing the storage device to process the data and provide the processed data to the computing device.

In a second aspect of the present disclosure, provided is a method of processing data. The method comprises: sending, from a computing device to a storage device associated with the computing device, a request for processing data at the storage device, the data being predetermined to be processed at the computing device; and receiving the processed data from the storage device, the data being processed by the storage device when available resources of the storage device exceeds a first predetermined threshold.

In a third aspect of the present disclosure, provided is a device for managing a storage system. The device comprises: at least one processing unit; at least one memory coupled to the at least one processing unit and storing instructions to be executed by the at least one processing unit, the instructions, when being executed by the at least one processing unit, causing the device to perform acts comprising: determining whether an event triggering processing of data at a storage device occurs, the data being predetermined to be processed at a computing device associated with the storage device; in response to determining that the event occurs, determining available resources of the storage device; and in response to an amount of the available resources exceeding a first predetermined threshold, causing the storage device to process the data and provide the processed data to the computing device.

In a fourth aspect of the present disclosure, provided is a device for managing a storage system. The device comprises: at least one processing unit; at least one memory coupled to the at least one processing unit and storing instructions to be executed by the at least one processing unit, the instructions, when being executed by the at least one processing unit, causing the device to perform acts comprising: sending, from a computing device to a storage device associated with the computing device, a request for processing data at the storage device, the data being predetermined to be processed at the computing device; and receiving the processed data from the storage device, the data being processed by the storage device when available resources of the storage device exceeds a first predetermined threshold.

In a fifth aspect of the present disclosure, provided is a computer program product. The computer program product is tangibly stored on a non-transient computer readable medium and comprising machine executable instructions which, when being executed, causing a machine to perform steps of the method according to the first aspect of the present disclosure.

In a sixth aspect of the present disclosure, provided is a computer program product. The computer program product is tangibly stored on a non-transient computer readable medium and comprising machine executable instructions which, when being executed, causing a machine to perform steps of the method according to the second aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the more detailed description of exemplary embodiments of the present disclosure with reference to the accompanying drawings, the above and other objects, features, and advantages of the present disclosure will become more apparent, wherein the same reference numerals typically represent the same components in the exemplary embodiments of the present disclosure.

Throughout the figures, the same or corresponding numerals denote the same or corresponding parts.

DETAILED DESCRIPTION

Some preferred embodiments will be described in more detail with reference to the accompanying drawings, in which the preferred embodiments of the present disclosure have been illustrated. However, the present disclosure can be implemented in various manners, and thus should not be construed to be limited to embodiments disclosed herein. On the contrary, those embodiments are provided for the thorough and complete understanding of the present disclosure, and completely conveying the scope of the present disclosure to those skilled in the art.

The terms "comprise" and its variants used here are to be read as open terms that mean "include, but is not limited to." Unless otherwise specified, the term "or" is to be read as "and/or." The term "based on" is to be read as "based at least in part on". The terms "one example embodiment" and "one embodiment" are to be read as "at least one embodiment." The term "another embodiment" is to be read as "at least one other embodiment." The terms "first," "second" and the like may refer to different or the same objects. Other definitions, explicit and implicit, might be included below.

As described in the Background, the traditional deep learning system architecture needs to process more and more data. Since data are processed only in the computing cluster, the data processing efficiency is limited, and further the traditional deep learning architecture is incapable of performing as required/needed. Since the present disclosure mainly focuses on data processing (pre-processing) by central processing units in the computing cluster during deep learning, other than training of processed data by graphics processing units in the computing cluster, the deep learning system in the present disclosure may also be construed as a data processing system. The data processing system mentioned in the present disclosure may comprise an artificial intelligence system, a machine learning system, a deep learning system and other system for processing data.

Figure 1:
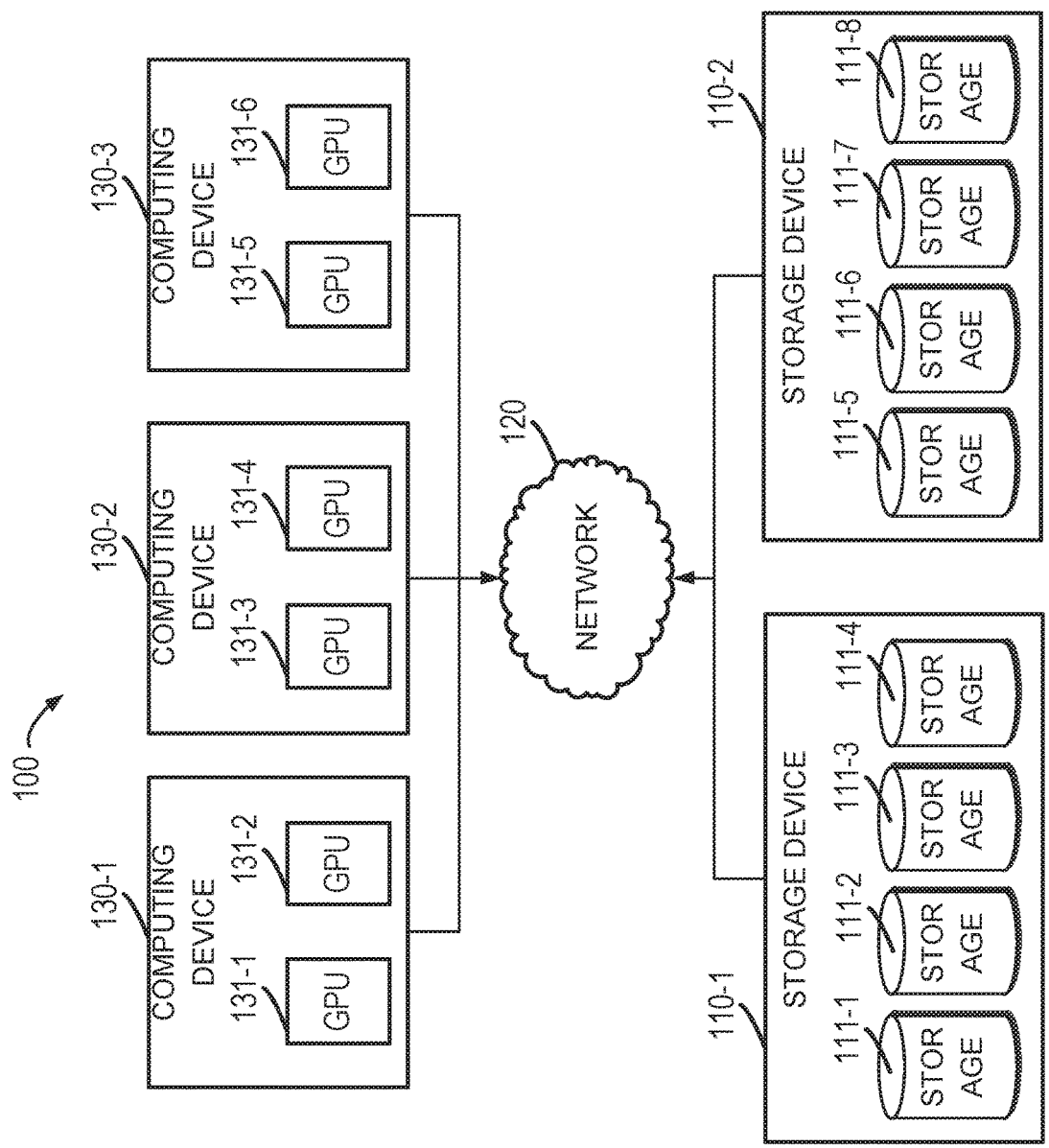
FIG. 1 shows a schematic view of a data processing system in a traditional solution.

FIG. 1 shows a schematic view of a data processing system 100 in a traditional solution. Meanwhile, the data processing system 100 shown in FIG. 1 may also be applicable to embodiments of the present disclosure.

The data processing system 100 may be, for example, a distributed data processing system. As depicted, the data processing system 100 comprises: two storage devices 110-1 and 110-2 (collectively referred to as storage device 110), a network 120 as well as three computing devices 130-1, 130-2 and 130-3 (collectively referred to as computing device 130). The storage device 110-1 comprises four storage units 111-1, 111-2, 111-3 and 111-4, and the storage device 110-2 comprises four storage units 111-5, 111-6, 111-7 and 111-8. The eight storage units may be collectively referred to as storage 111, which is essentially a shared storage system that contains massive raw datasets (such as images) and is particularly suitable for distributed training. The computing device 130-1 comprises two graphics processing units 131-1 and 131-2, the computing device 130-2 comprises two graphics processing units 131-3 and 131-4, and the computing device 130-3 comprises two graphics processing units 131-5 and 131-6. The six graphics processing units may be collectively referred to as graphics processing unit 131, which may run single or distributed data training based on the traditional deep learning framework. The network 120 may connect the storage device 110 and the computing device 130 via various techniques, including the Transmission Control Protocol (TCP), remote direct memory access (RMDA), etc.

It should be understood FIG. 1 shows that the computing device 130 comprises the graphics processing unit 131, to explain the training of processing data in the data processing system 100 is implemented at the computing device 130, rather than indicating the storage device 110 will not comprise any graphics processing unit. In addition, both the storage device 110 and the computing device 130 may comprise central processing units, which may be used to process data. It should be further understood the number of each element in the data processing system 100 shown in FIG. 1 is merely exemplary, and the scope of the present disclosure is not limited in this regard.

In the data processing system 100 shown in FIG. 1, the storage device 110 is used to store raw data to be processed, which are transmitted to the computing device 130 via the network 120. Central processing units in the computing device 130 process these raw data, and processed raw data are used for training by the graphics processing unit 131 in the computing device 130. As shown by arrows leading from the storage device 110 and the computing device 130 to the network 120 respectively, in the data processing system 100, the storage device 110 and the computing device 130 interact with and transmit data to each other via the network 120.

When the data processing system 100 is used for typical (distributed) deep learning training, at each training iteration (each mini-batch for to-be-trained data), each computing device 130 will read raw datasets from the storage device 110, run necessary ETL (extract, transform, load) operations, such as shuffling, decoding, and re-sizing, followed by some advanced data augmentations. Data processed as such are finally fed into the graphics processing unit 131 for training.

Figure 2:
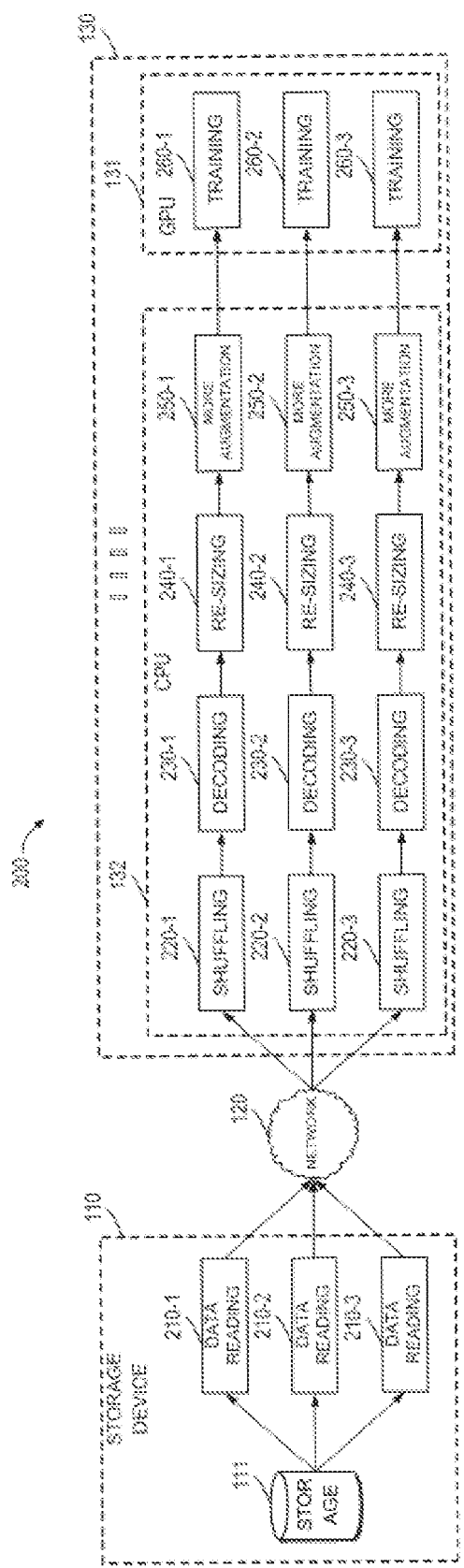
FIG. 2 shows a schematic view of an operation pipeline in a data processing system in a traditional solution.

FIG. 2 shows a schematic view of an operation pipeline 200 of the data processing system 100 in the traditional solution.

As shown in FIG. 2, the operation pipeline 200 is embodied in the storage device 110, the network 120 and the computing device 130. What is first performed in the storage device 110 is distributed data reads 210-1, 210-2 and 210-3 (collectively referred to as data read operation 210) from the storage 111, and this operation aims to read raw datasets from the storage 111 to be provided to the computing device 130. After the data read operation 210, raw datasets read from the storage 111 are provided via the network 120 to the computing device 130 for processing.

The computing device 130 may comprise a CPU (central processing unit) 132 and a GPU (graphics processing unit) 131, wherein the central processing unit 132 is used to process (pre-process) data read from the storage device 110, and the graphics processing unit 132 is used to train with data processed by the central processing unit 132 and may be a real entity component. Therefore, in the computing device 130, regarding raw datasets read from the storage 111, operations performed first may be shuffling operations 220-1, 220-2 and 220-3 (collectively referred to as shuffling operation 220), then decoding operations 230-1, 230-2 and 230-3 (collectively referred to as decoding operation 230), followed by re-sizing operations 240-1, 240-2 and 240-3 (collectively referred to as re-sizing operation 240), and later more augmentation operations 250-1, 250-2 and 250-3 (collectively referred to as augmentation operation 250). The augmentation operation 250 may comprise, for example, sample-wise standardization, feature-wise standardization, whitening, random rotation, shifts, shear and flips, dimension reordering, etc. The above processing operations and other possible operations are very important to the data processing system 100. For example, some graphics processing units 131 might only accept a specific image shape as input. Meanwhile, the augmentation operation 250 is also critical for the graphics processing unit 131, otherwise some graphics processing units 131 might only work perfectly to the samples trained by themselves but are much worse for new data which are never seen. Raw datasets read from the storage 111, after processed by the central processing unit 132, are sent (in tensor or N-dim array) to the graphics processing unit 131 for training operations 260-1, 260-2 and 260-3 (collectively referred to as training operation 260).

The purpose of the set of three-row operations shown in FIG. 2 is to illustrate the operation pipeline 200 is a distributed operation pipeline, wherein items and the number of operations as well as the number of pipelines are all variable.

The data processing system 100 and the operation pipeline 200 in traditional solutions have been described in conjunction with FIGS. 1 and 2. Although traditional solutions may be applicable to data processing, they contain many deficiencies.

First of all, as shown in FIG. 2, some processing operations (such as shuffling and decoding) need to be performed on each computing device 130. Though such pre-processing operations are important for the accuracy of the subsequent training operation 260, running highly-identical or similar operations at each computing device 130 is not an ideal way in terms of resource efficiency. Particularly, in actual use, the same raw datasets often need to be loaded on multiple computing devices of the computing devices 130 for training. Therefore, huge duplicate data processing will cause a waste of computing resources of the computing device 130 with respect to the central processing unit 132.

In addition, in the data transmission regard, since the same raw datasets might be loaded on multiple computing devices of the computing devices 130 for training, the same datasets need to be loaded from the storage device 110 via the network 120 to multiple computing devices of the computing device 130. As a result, there could be a lot of traffic from the storage device 110 to the computing device 130, and then the network transmission bandwidth is severely occupied. Further, sometimes the size of the raw datasets processed by the central processing unit 132 of the computing device 130 will become smaller than the original size of the raw datasets, and the size even becomes from 10 GB before the processing to 100 MB after the processing. In this case, if the processed raw datasets can be transmitted via the network 120, then the network transmission bandwidth may be greatly saved. Moreover, since the transmission of the network 120 is unstable, in some cases, the network transmission might become a bottleneck to the execution efficiency of the data processing system 100, and further affect the smooth start and scalability of each operation in the operation pipeline 200.

Furthermore, any operation in the whole operation pipeline 200 should be well matched, no matter running in the central processing unit 132 or the graphics processing unit 131, in the storage device 110, the network 120 or the computing device 130, or else inefficiency might be caused or specific operation could be a bottleneck to the operation pipeline 200. However, the data processing system 100 and the operation pipeline 200 in traditional solutions lack good negotiation across the storage device 110, the network 120 or the computing device 130, across different storage devices of the storage devices 110, and across different computing devices of the computing devices 130, such that the storage device 110 may only simply provide data loading, its CPU or accelerator inside might not be fully utilized in the data processing system 100 and the operation pipeline 200.

Finally, the data processing system 100 and the operation pipeline 200 in traditional solutions fail to utilize computing capabilities of the storage device 110, it is hard to flexibly control and manage the execution of different operations in the operation pipeline 200, and also it is hard to control the resource consumption of the storage device 110 and the computing device 130.

The data processing system 100 and the operation pipeline 200 in traditional solutions have been described with reference to FIGS. 1 and 2, now detailed description is presented below to specific flows and operations of methods 300 and 400 for processing data according to embodiments of the present disclosure by referring to FIGS. 3 and 4.

In order to at least partly eliminate the above problems in traditional solutions, embodiments of the present disclosure propose a method of processing data. In the content of the present disclosure, a core idea is to utilize computing capabilities (central processing units, etc.) in the storage device 110 to perform processing operations that used to be performed by the computing device 130. In the present disclosure, to make the whole operation pipeline 200 (including processing operations by the central processing unit 132 and training operations by the graphics processing unit 131) more efficient and better leverage the resources, there is proposed a method, which dynamically schedules and deploys various processing operations in the operation pipeline 200 so that these operations may be performed on the data processing system 100, i.e., the place where raw datasets are stored. The method of processing data according to embodiments of the present disclosure may be applicable to a long-running background mode or an ad-hoc mode, with flexible configurable policy (about when, where, how to run the processing operation at what kinds of resource limit). So processing operations can be proactive and efficient, duplicate processing efforts can be reduced, and the overall resource utilization of the data processing system 100 can be improved.

Figure 3:
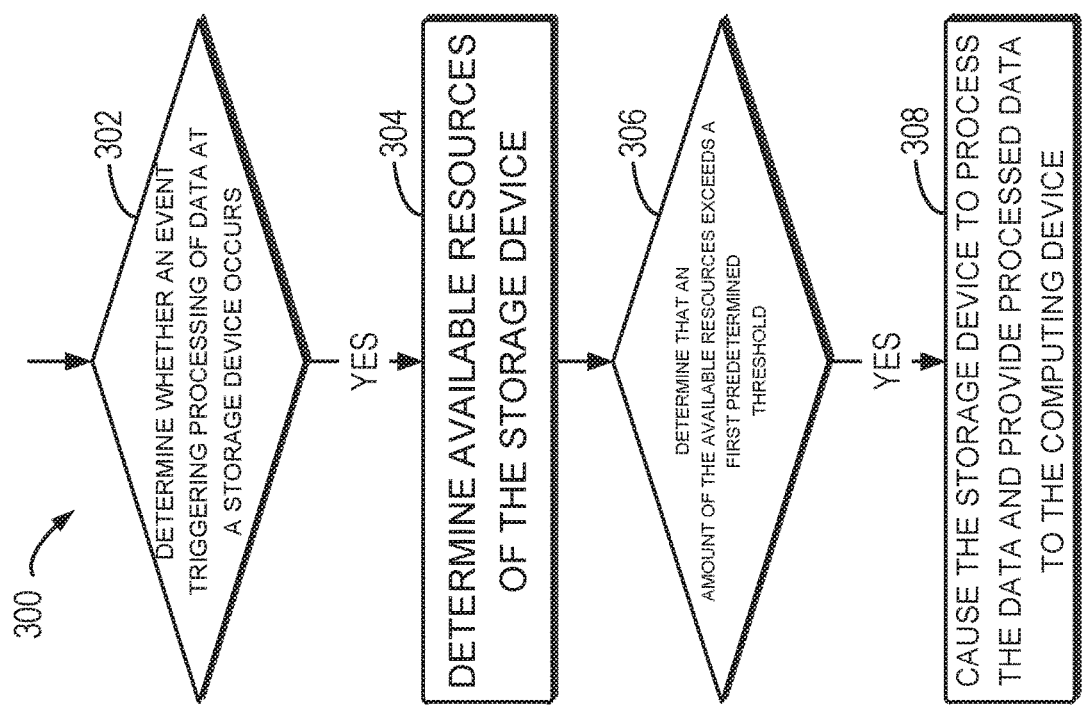
FIG. 3 shows a flowchart of a method for processing data according to embodiments of the present disclosure.

FIG. 3 shows a flowchart of a method 300 for processing data according to embodiments of the present disclosure. The method 300 for processing data is described from the perspective of the storage device 110, and specifically may be performed by the storage device 110 or other appropriate device in the data processing system 100. It should be understood the method 300 may further comprise an additional step which is not shown and/or omit a step which is shown, and the scope of the present disclosure is not limited in this regard.

At block 302, the storage device 110 determines whether an event triggering data processing at the storage device 110 occurs. According to embodiments of the present disclosure, the data are predetermined to be processed at the computing device 130 associated with the storage device 110.

As described above, the method 300 for processing data may operate in long-running background mode or ad-hoc mode. Therefore, the event triggering data processing at the storage device 110 varies with respect to these two modes. According to embodiments of the present disclosure, the event triggering data processing at the storage device 110 may comprise at least one of: the storage device 110 detecting the data are to-be-processed data stored in the storage device 110, and the storage device 110 determining a request for processing the data is received from the computing device 130.

Specifically, the above two different events correspond to a long-running background mode and an ad-hoc mode respectively. In long-running background mode, once data enter the data processing system 100, data may be proactively processed in background, wherein operations to be performed on data run in low priority and may be paused for a while. Therefore, long-running background mode is quite useful for regular training jobs, so that data may be processed with respect to multiple training jobs. The storage device 110 detects whether to-be-processed data are stored therein, and this is regarded as an event triggering data processing at the storage device 110. In ad-hoc mode, data are not processed once entering the data processing system 100, but are first stored and then processed through negotiation between the storage device 110 and the computing device 130. Operations to be performed to data may be weighted, so that the overall resource utilization or specific job processing performance of the data processing system 100 may be improved. The training job in ad-hoc mode usually ends after running once, which may be run for several hours and even a whole week and is not processed in background if not running. Therefore, it may be considered the storage device 110 receives from the computing device 130 a request for processing data, and receiving the request is used as an event triggering data processing at the storage device 110.

At block 304, in response to determining at block 302 the event triggering data processing at the storage device 110 occurs, the storage device 110 determines available resources of the storage device 110. According to embodiments of the present disclosure, available resources of the storage device 110 may comprise available computing resources and available storage space of the storage device 110, so determining the available resources of the storage device 110 may comprise at least one of determining available computing resources of the storage device 110 and determining available storage space of the storage device 110. The operation at block 304 aims to a purpose of determining from the available resources of the storage device 110 whether the storage device 110 may process data in response to the event triggering data processing at the storage device 110, in subsequent operations.

At block 306, the storage device 110 determines whether an amount of the available resources determined at block 304 exceeds a first predetermined threshold.

At block 308, in response to determining that the amount of the available resources determined at block 304 exceeds the first predetermined threshold, the storage device 110 processes data. Data processed by the storage device 110 may be provided to the computing device 130 for further processing.

According to embodiments of the present disclosure, since the storage device 110 might have occupied a large amount of computing resources and storage space for performing other processing operation (including processing other to-be-processed data of the data processing system 100) and having stored too much data, at this point to process new data will further occupy the remaining computing resources and might occupy more storage space, which leads to the performance deterioration of the storage device 110. Therefore, first available resources of the storage device 110 need to be determined as shown at block 304, and then as shown at blocks 306 and 308, when the amount of the available resources exceeds a certain predetermined threshold, the storage device 110 processes data. According to embodiments of the present disclosure, the predetermined threshold (first predetermined threshold) for the available resources of the storage device 110 may be set according to the overall resources situation and performance of the storage device 110. For example, regarding the computing resource, the predetermined threshold may be set such that the average utilization of the central processing unit of the storage device 110 is below 30% in the past 1 minute or the total number of unused cores of the central processing unit of the storage device 110 reaches a certain percent (e.g., 20%). Regarding the storage space, the predetermined threshold may be set such that a free storage space in the storage device 110 is larger than 4 GB. In addition, if the task of processing data is executed in a specific container of the storage device 110, it may be specified only when with CPU limit as 20% of the total core number (or up to 8 cores) of the central processing unit of the storage device 110 are used and/or the free storage space in the storage device 110 is larger than 2 GB, the storage device 110 processes data.

As described above, the method 300 may further comprise an additional step which is not expressly shown. For example, regarding the storage device 110 processing data at block 308, the method 300 may further comprise the storage device 110 allocating resources of the storage device 110 for processing the data according to the amount of to-be-processed data and the resource volume for processing the data, and this step is particularly useful when the storage device 110 may allocate a specific number of cores in the central processing unit for processing the data.

For another example, the method 300 may further comprise the storage device 110 coordinating with the computing device 130 on processing the data and determining a negotiation result, wherein the negotiation result may indicate which operations among the data processing operations will be performed by the storage device 110. According to embodiments of the present disclosure, the data processing operations may comprise the shuffling operation 220, the decoding operation 230, the re-sizing operation 240 and the augmentation operation 250, among which the augmentation operation 250 may comprise sample-wise standardization, feature-wise standardization, whitening, random rotation, shifts, shear and flips, dimension reordering, etc. However, not all these operations need to be performed by the storage device 110, but the storage device 110 may coordinate with the computing device 130 to determine which of these operations are to be performed by the storage device 110. The negotiation may be conducted through interaction between the storage device 110 and the computing device 130 and may be conducted at any time before the storage device 110 starts to process the data. According to embodiments of the present disclosure, for example, when building the data processing system 100, the storage device 110 may be coordinate with the computing device 130 to determine which of the data processing operations are to be performed by the storage device 110. Likewise, when running the data processing system 100, the storage device 110 and the computing device 130 may determine which operations are to be performed by the storage device 110, in view of their available resources. The storage device 110 will process the data based on the negotiation result.

For another example, when the storage device 110 determines the data may be processed in response to the amount of the available resources of the storage device 110 exceeding the first threshold as shown at block 308, the storage device 110 may notify the computing device 130 that the data will be, are being or have been processed by the storage device 110, before, when or after processing the data. Thereby, the computing device 130 may no longer try reading the data but wait for the storage device 110 to transmit the processed data.

In addition, after the storage device 110 starts to process the data, since the available resources of the storage device 110 occupied for processing the data might change and further cause the computing performance deterioration of the storage device 110, the storage device 110 may continue to monitor the available resources of the storage device to determine updated available resources of the storage device 110. When the storage device 110 determines that an amount of the update available resources of the storage device 110 is below a given predetermined threshold (e.g., second predetermined threshold), it may pause the data processing and/or reduce the data processing operation, so that the available resources of the storage device 110 will not further deteriorate or the available resources may be increased. The second threshold may be set as higher than the first threshold. For example, regarding the computing resource, the second predetermined threshold may be set such that the average utilization of the central processing unit of the storage device 110 is higher than 50% in the past 1 minute. Regarding the storage space, the second predetermined threshold may be set such as the free storage space in the storage device 110 is less than 2 GB. When the storage device 110 reduces the data processing operation because the amount of the updated available resources is determined as below the second threshold, the storage device 110 may notify the computing device 130 so that the computing device 130 may know these reduced operations will be performed by the computing device 130.

Figure 4:
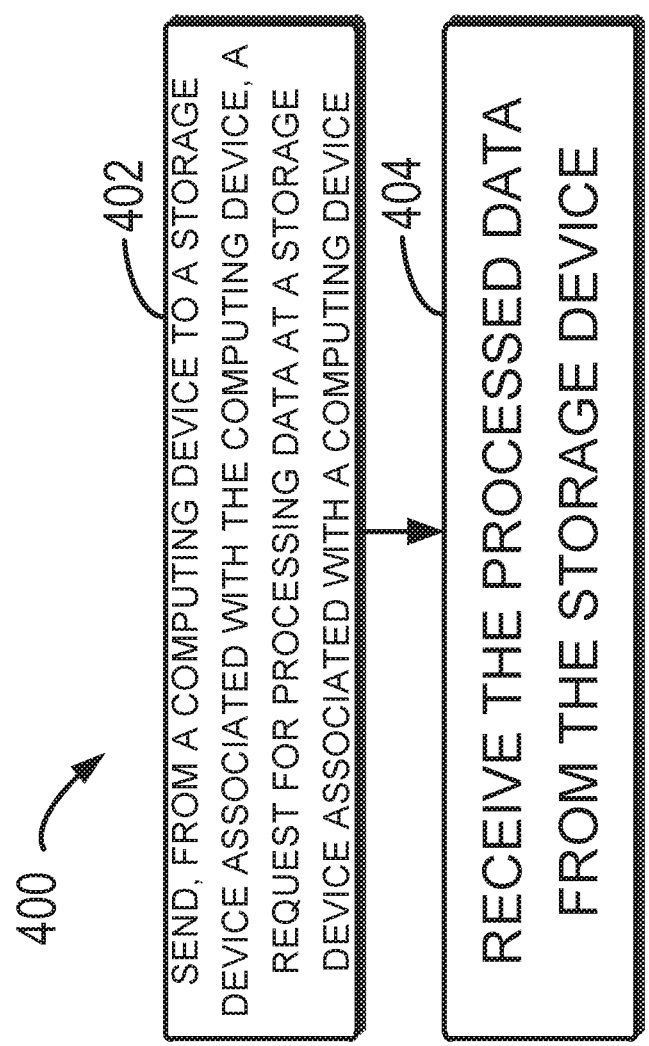
FIG. 4 shows a flowchart of a method for processing data according to embodiments of the present disclosure.

FIG. 4 shows a flowchart of a method 400 for processing data according to embodiments of the present disclosure. The method 400 for processing data is described from the perspective of the computing device 130, and specifically may be performed by the computing device 130 or other appropriate device in the data processing system 100. It should be understood the method 400 may further comprise an additional step which is not shown and/or omit a step which is shown, and the scope of the present disclosure is not limited in this regard.

At block 402, the computing device 130 sends to the storage device 110 associated with the computing device 130 a request for processing data at the storage device 110. According to embodiments of the present disclosure, the data are predetermined to be processed at the computing device 130.

As described above, the method 400 for processing data may operate in long-running background mode or ad-hoc mode. Therefore, the event triggering data processing at the storage device 110 may comprise the storage device 110 determining a request for processing the data is received from the computing device 130. Therefore, it may be considered the storage device 110 receives a request for processing data from the computing device 130, and receiving the request is regarded as the event triggering data processing at the storage device 110.

According to embodiments of the present disclosure, the computing device 130 sending the request to the storage device 110 at block 402 may comprise the computing device 130 determining available resources of the computing device 130 and sending the request to the storage device 110 in response to the determined amount of the available resources being below a third predetermined threshold. The steps usually occur in ad-hoc mode. At this point, the computing device 130 determines whether its available resources are heavily used, and when an amount of the available resources is below a certain predetermined threshold (third predetermined threshold), the computing device 130 sends the request for processing the data to the storage device 110. According to embodiments of the present disclosure, the available resources of the computing device 130 may comprise available computing resources and available storage space of the computing device 130, and determining the available resources of the computing device 130 may comprise determining at least one of available computing resources and available storage space of the computing device 130. According to embodiments of the present disclosure, the predetermined threshold (third predetermined threshold) for the available resources of the computing device 130 may be set according to the overall resource situation and performance of the computing device 130. For example, regarding the computing resource, the predetermined threshold may be set such that the average utilization of the central processing unit of the computing device 130 is higher than 90% in the past 1 minute, at which point the data processing speed of the computing device 130 is possibly quite low. Regarding the storage space, the predetermined threshold may be set such that a free storage space in the computing device 130 is less than 2 GB, at which point the computing device 130 may pause reading new data so that the processing flow is interrupted.

At block 404, the computing device 130 receives the processed data from the storage device 110. Corresponding to the method 300 for processing data as described with reference to FIG. 3, the data received by the computing device 130 are processed by the storage device 110 when an amount of the available resources of the storage device 110 exceeds the first predetermined threshold.

As described above, the method 400 may further comprise an additional step which is not expressly shown. For example, the method 400 may further comprise the computing device 130 coordinating with the storage device 110 on processing the data and determining a negotiation the negotiation result, wherein the negotiation result may indicate which operations among the data processing operations will be performed by the storage device 110. The content, step and time of the negotiation correspond to the content, step and time of the negotiation in the method 300 for processing data as described with reference to FIG. 3, which are not detailed here. Through the negotiation, the storage device 110 processes the data based on the negotiation result.

Figure 5:
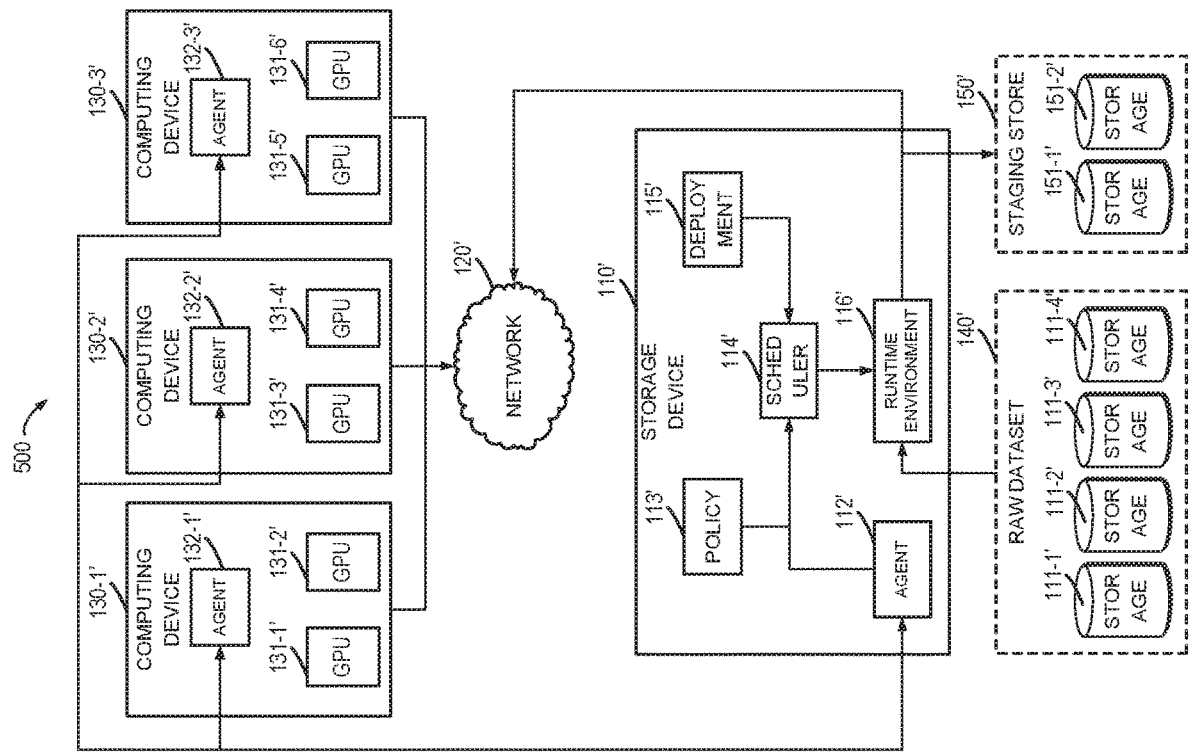
FIG. 5 shows a schematic view of a data processing system according to embodiments of the present disclosure.

FIG. 5 shows a schematic view of a data processing system 500 according to embodiments of the present disclosure. Specific flows and operations of the methods 300 and 400 for processing data according to embodiments of the present disclosure as described with reference to FIGS. 3 and 4 may be performed by a storage device 110', a computing device 130' or other appropriate device in the data processing system 500.

As shown in FIG. 5, the data processing system 500 comprises the storage device 110', a network 120', the computing device 130', a raw dataset 140' and a staging store 150'. The functionality of the network 120' is similar to that of the network 120 described with reference to FIG. 1, which is not detailed here. The raw dataset 140' comprises storage 111-1', 111-2', 111-3' and 111-4' (collectively referred to as storage 111'). Note in the data processing system 500, unlike the storage 111 being located in the storage device 110 in the data processing system of FIG. 1, the storage 111' is illustrated as being located in the raw dataset 140' rather than the storage device 110'. However, such illustration is merely exemplary, and the raw dataset 140' and the storage 111' comprised therein may also be located in the storage device 110', without any impact on the implementation of embodiments of the present disclosure. Likewise, the staging store 150' comprising storage 151-1' and 151-2' (collectively referred to as storage 151') may also be located in the storage device 110', without any impact on the implementation of embodiments of the present disclosure. In addition, although FIG. 5 shows only one storage device 110', this is for the sake of description, and in fact FIG. 5 may also comprise multiple storage devices 110' like FIG. 1, without any impact on the implementation of embodiments of the present disclosure.

As shown in FIG. 5, unlike the data processing system 100 shown in FIG. 1, the storage device 110' comprises an agent 112', and the computing devices 130-1', 130-2' and 130-3' (collectively referred to as computing device 130') comprise agents 132-1', 132-2' and 132-3' (collectively referred to as agent 132') respectively, the agents 112' and 132' being used to monitor the storage device 110' and the computing device 130' and communication and negotiation between them to provide a basis for scheduling various operations performed to data by using a policy 113' in the storage device 110'. Specifically, the agents 112' and 132' may use cmd, utilities, API from the operating system or the data processing system 500 to collect metrics for monitoring the storage device 110' and the computing device 130', the output can be staged in some buffer (i.e., for every 5 sec) and then inputted to a scheduler 114' for decision making.

The policy 113' in the storage device 110' in FIG. 5 represents criteria for scheduling various operations performed to data and for controlling the storage device 110' and the computing device 130' to perform various operations. The policy 113' may correspond to the available resource, the first threshold, the second threshold, the third threshold and like involved in the methods 300 and 400 for processing data according to embodiments of the present disclosure as described with reference to FIGS. 3 and 4. That is, the policy 113' may comprise: the storage device 110' detecting the data are to-be-processed data stored in the storage device 110', the storage device 110' determining the request for processing the data is received from the computing device 130', the storage device 110' determining an amount of the available resources determined at block 304 exceeds a first predetermined threshold, the storage device 110' determining that an amount of the updated available resources is below a second predetermined threshold, and the computing device 130' determining that an amount of the available resources of the computing device 130' is below a third predetermined threshold, wherein the threshold may comprise, for example, the usage of the central processing unit, the size of free storage space, the network bandwidth, and the computing performance of the computing device 130' (e.g., training throughput, e.g. images/sec), etc.

The scheduler 114' in the storage device 110' in FIG. 5 may be construed as a control module that dynamically manages data operations based on the output of the agents 112' and 132' or the policy 113', including start, pause, resume, stop etc. The management may be implemented either dynamically or manually.

A deployment 115' in the storage device 110' in FIG. 5 represents a module supporting a user to deploy an operation to data, which may comprise, for example, interfaces. The user may upload and deploy the packed container, virtual machine or a runnable binary. Note, although the deployment 115' module may comprise some common libraries, the user is also responsible for building the end-end pre-processing logics (corresponding to operations to be performed to data), as it is highly related to the training job. The deployment 115' module may notify the storage device 110' and the computing device 130' of policies comprised in the policy 114'.

A runtime environment 116' in the storage device 110' in FIG. 5 represents a logically isolated environment of operations to be performed to data. The runtime environment 116' may be, for example, a container which can be launched quickly, with throttled resource usage (e.g., up to 8 cores, 2 GB memory) etc. The runtime environment 116' may run in a virtual machine, a bare metal or a container.

The staging store 150' in the storage device 110' in FIG. 5 is used to temporarily store data processed by the storage device 110', before being provided to the computing device 130'.

Flows of the methods 300 and 400 for processing data and respective modules of the data processing system 500 have been described with reference to FIGS. 3 to 5. It should be understood the above description is intended to better present the content of the preset disclosure rather than limiting in any manner.

As seen from the above description with reference to FIGS. 1 to 5, the technical solution according to embodiments of the present disclosure has many advantages over the traditional solution. First of all, by means of the technical solution according to embodiments of the present disclosure, operations to be performed to data may be adaptively allocated, deployed and adjusted on the storage device and the computing device, so that computing capabilities of both the storage device and the computing device may be fully leveraged, and further the computing efficiency of the whole data processing system may be improved. In addition, the technical solution according to embodiments of the present disclosure is not complex and easy to implement. Moreover, the technical solution according to embodiments of the present disclosure will not affect other service on the data processing system. Finally, the technical solution according to embodiments of the present disclosure is user-friendly, which may be set and adjusted by the user on demand.

Figure 6:
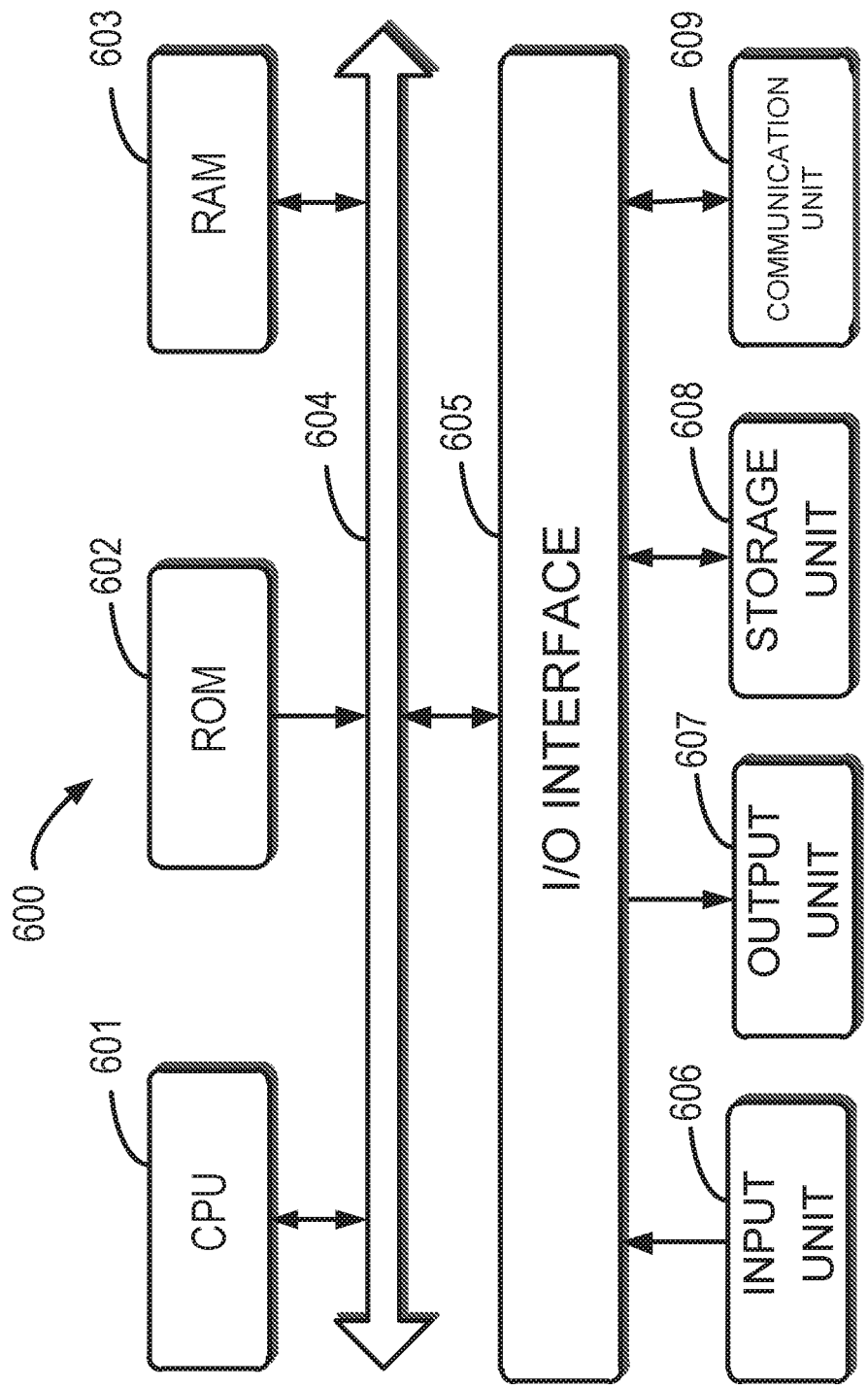
FIG. 6 shows a schematic block diagram of an example device which is applicable to implement embodiments of the present disclosure.

FIG. 6 shows a schematic block diagram of an example device 600 suitable for implementing embodiments of the present disclosure. As depicted, the device 600 comprises a central processing unit (CPU) 601 which is capable of performing various appropriate actions and processes in accordance with computer program instructions stored in a read only memory (ROM) 602 or computer program instructions loaded from a storage unit 608 to a random access memory (RAM) 603. In the RAM 603, there are also stored various programs and data required by the device 600 when operating. The CPU 601, the ROM 602 and the RAM 603 are connected to one another via a bus 604. An input/output (I/O) interface 605 is also connected to the bus 604.

Multiple components in the device 600 are connected to the I/O interface 605: an input unit 606 including a keyboard, a mouse, or the like; an output unit 607, such as various types of displays, a loudspeaker or the like; a storage unit 608, such as a disk, an optical disk or the like; and a communication unit 609, such as a LAN card, a modem, a wireless communication transceiver or the like. The communication unit 609 allows the device 600 to exchange information/data with other device via a computer network, such as the Internet, and/or various telecommunication networks.

The above-described procedures and processes (such as the methods 300 and 400) may be executed by the processing unit 601. For example, in some embodiments, the methods 300 and 400 may be implemented as a computer software program, which is tangibly embodied on a machine readable medium, e.g. the storage unit 608. In some embodiments, part or the entirety of the computer program may be loaded to and/or installed on the device 600 via the ROM 602 and/or the communication unit 609. The computer program, when loaded to the RAM 603 and executed by the CPU 601, may execute one or more acts of the methods 300 and 400 as described above.

The present disclosure may be a method, an apparatus, a system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to embodiments disclosed. Many modifications and variations will be apparent to those of ordinary skill in the art without departing from the scope and spirit of the described embodiments. The terminology used herein was chosen to best explain the principles of embodiments, the practical application or technical improvement over technologies found in the marketplace, or to enable others of ordinary skill in the art to understand embodiments disclosed herein.

What is claimed is:

1. A method of processing data, comprising:
   determining, by a storage device, whether an event triggering processing of data at the storage device occurs, the data being predetermined to be processed at a computing device associated with the storage device;
   in response to determining that the event occurs, determining, by the storage device, available resources of the storage device;
   in response to an amount of the available resources of the storage device exceeding a first predetermined threshold, causing the storage device to process the data rather than the computing device processing the data and provide the processed data from the storage device to the computing device;
   determining, by the storage device, updated available resources of the storage device, the available resources being updated due to processing the data; and
   in response to an amount of the updated available resources being below a second predetermined threshold, performing, by the storage device, at least one of:
   pausing processing of the data; and
   reducing operations of processing the data.

2. The method according to claim 1, wherein determining whether the event triggering processing of data at the storage device occurs comprises at least one of:
   in response to determining that the data is detected to be to-be-processed data stored in the storage device, determining that the event occurs; and
   in response to determining that a request for processing the data is received from the computing device, determining that the event occurs.

3. The method according to claim 1, wherein determining the available resources of the storage device comprises at least one of:
   determining available computing resources of the storage device; and
   determining available storage space of the storage device.

4. The method according to claim 1, wherein processing the data comprises:
   performing, on the data, at least one of: shuffling, decoding, re-sizing, and data augmentation.

5. The method according to claim 1, further comprising:
   notifying the computing device that the storage device processes the data.

6. The method according to claim 1, wherein reducing the operation of processing the data comprises:
   notifying the computing device of the reduced operations.

7. The method according to claim 1, wherein processing the data comprises:
   determining a negotiation result between the storage device and the computing device regarding processing the data, the negotiation result indicating which operations among operations of processing the data will be performed by the storage device; and
   processing the data based on the negotiation result.

8. A computer program product being tangibly stored on a non-transient computer readable medium and comprising machine executable instructions which, when being executed, causing a machine to perform steps of the method of claim 1.

9. A device for processing data, comprising at least one processing unit; at least one memory coupled to the at least one processing unit and storing instructions to be executed by the at least one processing unit, the instructions, when being executed by the at least one processing unit, causing the device to perform steps of the method of claim 1.

10. A method of processing data, the method comprising:
    sending, from a computing device to a storage device associated with the computing device, a request for processing data at the storage device, the data being predetermined to be processed at the computing device;
    receiving, at the computing device, the processed data from the storage device, the data being processed by the storage device rather than the computing device processing the data when available resources of the storage device exceed a first predetermined threshold;
    responsive to an amount of updated available resources of the storage device being below a second predetermined threshold, receiving, at the computing device, notification of a reduction in operations of processing the data; and
    performing, by the computing device, at least a portion of the operations of processing the data.

11. The method according to claim 10, wherein sending the request comprises:
    determining available resources of the computing device; and
    in response to an amount of the available resources of the computing device being below a third predetermined threshold, sending the request to the storage device.

12. The method according to claim 11, wherein determining the available resources of the computing device comprises at least one of:
    determining available computing resources of the computing device; and
    determining available storage space of the computing device.

13. The method according to claim 10, further comprising:
    determining a negotiation result between the computing device and the storage device regarding processing the data, the negotiation result indicating which operations among operations of processing the data will be performed by the storage device.

14. The method according to claim 10, wherein processing the data comprises:
performing, on the data, at least one of: shuffling, decoding, re-sizing, and data augmentation.

15. A computer program product being tangibly stored on a non-transient computer readable medium and comprising machine executable instructions which, when being executed, causing a machine to perform steps of the method of claim 10.

16. A device for processing data, comprising:
at least one processing unit;
at least one memory coupled to the at least one processing unit and storing instructions to be executed by the at least one processing unit, the instructions, when being executed by the at least one processing unit, causing the device to perform acts comprising:
sending, from a computing device to a storage device associated with the computing device, a request for processing data at the storage device, the data being predetermined to be processed at the computing device;
receiving, at the computing device, the processed data from the storage device, the data being processed by the storage device rather than the computing device processing the data when available resources of the storage device exceed a first predetermined threshold;
responsive to an amount of updated available resources of the storage device being below a second predetermined threshold, receiving, at the computing device, notification of a reduction in operations of processing the data; and
performing, by the computing device, at least a portion of the operations of processing the data.

17. The device according to claim 16, wherein sending the request comprises:
determining available resources of the computing device; and
in response to an amount of the available resources of the computing device being below a third predetermined threshold, sending the request to the storage device.

18. The device according to claim 17, wherein determining the available resources of the computing device comprises at least one of:
determining available computing resources of the computing device; and
determining available storage space of the computing device.

19. The device according to claim 16, the acts further comprising:
determining a negotiation result between the computing device and the storage device regarding processing the data, the negotiation result indicating which operations among operations of processing the data will be performed by the storage device.

* * * * *